INVENTORS:
FRANCIS JOHN KELLY
FRANCISZEK PRZYBYLA
BY: Cavanagh & Norman

INVENTORS:
FRANCIS JOHN KELLY
FRANCISZEK PRZYBYLA
BY: *Cavanagh & Norman*

United States Patent Office 3,348,976
Patented Oct. 24, 1967

3,348,976
SELF-SUPPORTING SINTERED ZINC
ANODE STRUCTURE
Francis John Kelly, Port Credit, Ontario, and Franciszek Przybyla, Toronto, Ontario, Canada, assignors to Mallory Battery Company of Canada Limited, Clarkson, Ontario, Canada
Filed Mar. 30, 1965, Ser. No. 443,986
7 Claims. (Cl. 136—125)

This invention relates to a sintered porous zinc structure and to the method of making same.

There is a need for metal structures of high porosity i.e. high surface area volume ratio and of sound structural integrity for application in electrode structures for electrical batteries and the like. Useful electrode materials such as zinc and cadmium cannot be formed into porous bodies by sintering. It is known that an oxide film on copper or on silver can be removed by hydrogen reduction at less than the melting point of copper or silver. The sintering of copper or silver powders to form relatively dense porous structures is not difficult. However oxide films on zinc and cadmium are not removed by hydrogen reduction at a temperature below the melting point of such metals. It is for this reason that to date there are no commercially known techniques for the production sintering of zinc and cadmium metal powders.

The formation of sintered porous metal structures by the utilization of carbon or hydrocarbon fillers adapted to determine the porosity of the structure and to be burnt out during sintering is known. However the employment of hydrocarbon filler materials for such purpose will tend to contaminate the resulting structure with residue. Not all of the products of combustion can be removed in this manner. Furthermore the combustion disrupts the structure during sintering or prior to sintering as the temperature is raised. Thus for example it is known that a mixture of carbon particles and iron oxide particles compacted and subjected to heat may swell and burst in the formation of sponge iron. Filler material combustion is an old technique and is subject to many limitations and in particular limitations as to the degree of porosity which may be achieved. Porosity in such prior structures is limited generally to substantially less than fifty percent and is controlled mainly by compacting pressures.

It is a main object of this invention to provide a porous metal structure and method of making same in which the porosity is substantially independent of compacting pressure relative to the structural integrity of the structure itself.

It is a further object of the invention to provide a porous metal structure of full structural integrity by vacuum sublimation of a sublimable filler mixed with a powdered metal to determine the porosity thereof and adapted to be removed completely by sublimation at a temperature near to and less than sintering temperature.

Other objects of the invention will be apparent from the following specification taken in conjunction with the accompanying drawings.

Figure 6:
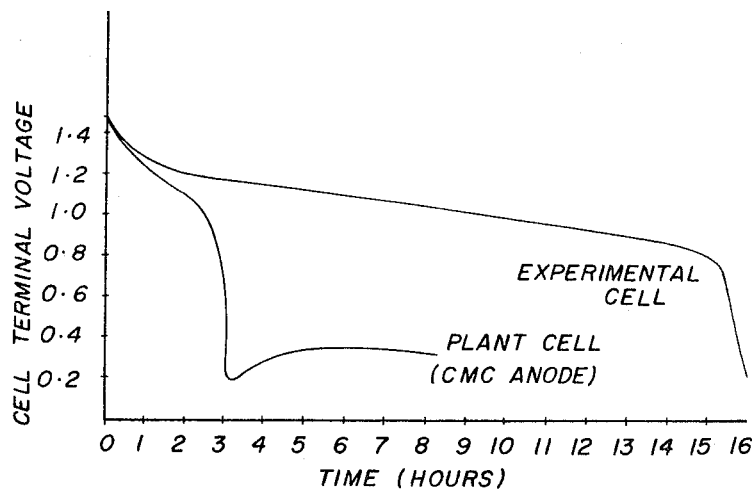

FIGURE 6 records the life by a voltage time curve of a zinc structure herein used as a battery anode compared with a conventional battery anode at low temperature.

Figure 7:
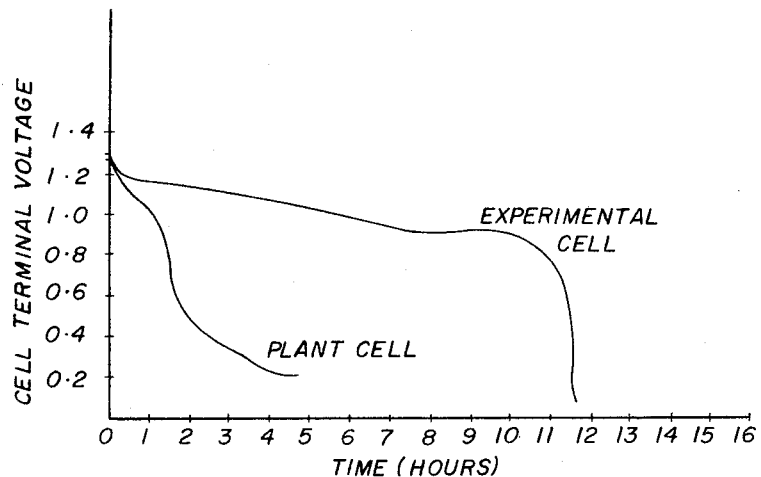

FIGURE 7 is a similar voltage time curve to that of FIGURE 6 for a different style of battery structure but again indicating the superiority of a cell employing the anode of the invention.

Figure 8:
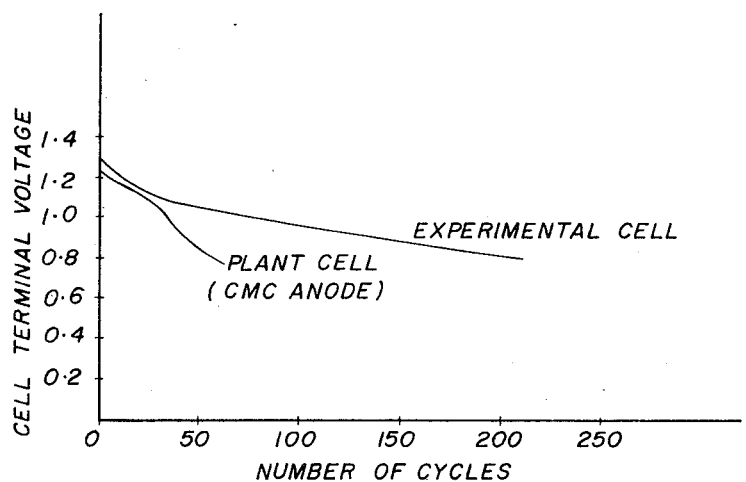

FIGURE 8 compares the cyclic discharge life of two battery cells one of which is conventional and the other of which embodies an anode formed of a zinc structure of the invention.

Zinc and cadmium particles once exposed to air are coated with a thin superficial layer of oxide. In order to bond the particles at temperatures below the melting point by sintering it is mandatory that the oxide layer be removed. This layer however cannot be reduced by hydrogen at temperatures below the melting point of the metal.

It is therefore necessary to remove the oxide by a reaction other than reduction. According to the invention and in the case of zinc successful chemical reactions appear to be of the form:

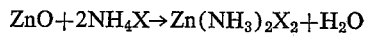

$$ZnO + 2NH_4X \rightarrow Zn(NH_3)_2X_2 + H_2O$$

in which X represents a chloride bromide or iodide ion. This reaction proceeds at a temperature considerably lower than the melting point of zinc. According to the invention the reaction product as well as any unchanged ammonium halide can be removed by sublimation under reduced pressure at such reaction temperature. At this and slightly higher temperatures the cleansed metal particle surfaces adhere in a preliminary sintering thus maintaining the particle structure established during the compacting process. Finally still under vacuum the zinc particle bonding is reinforced at the sintering temperature.

An essential feature of this method is that a preliminary bonding must be made between adjoining zinc particles concurrently with removal of the filling agent. This requires a sublimation temperature herein near the temperature at which sintering commences. This has been established as approximately 180° C. below sintering temperature. At this temperature the ammonium halides sublime slowly enough for a mixed pellet to maintain its integrity.

Deformation of individual zinc or cadmium particles begins to occur beyond 320° C. the maximum recommended temperature at which sintered zinc and cadmium structures with predetermined size and shape can be obtained.

Only a very small quantity of ammonium halide is required to remove a zinc or cadmium oxide film. The vast excess used in this process serves merely as filling agent. Ammonium halides are especially suitable as filling agents since they can be removed by vacuum sublimation at temperatures at which presintering of zinc and cadmium simultaneously occurs. Thus the structural form achieved by compaction is preserved during the removal of the filling agent.

In order to achieve metal structures of a desired porosity and shape an intimate mixture of metal and filler particles is compressed. The shape is determined by the die and the ultimate porosity by the volume of metal to filler as shown in Table 1:

TABLE 1

| Porosity of sintered zinc pellet | Filling agent content [1] (percent w./w.) | | |
|---|---|---|---|
| | NH₄Cl | NH₄Br | NH₄I |
| 56% | 15 | 18 | 19 |
| 60% | 19 | 32 | 33 |
| 65% | 24 | 37.5 | 38.5 |
| 70% | 30 | 43.5 | 44.5 |
| 75% | 36.5 | 50 | 51 |
| 80% | 45 | 57 | 58 |
| 82% | 48 | 60 | 61.5 |

[1] Compacting pressures listed in Table 2.

Figure 4:
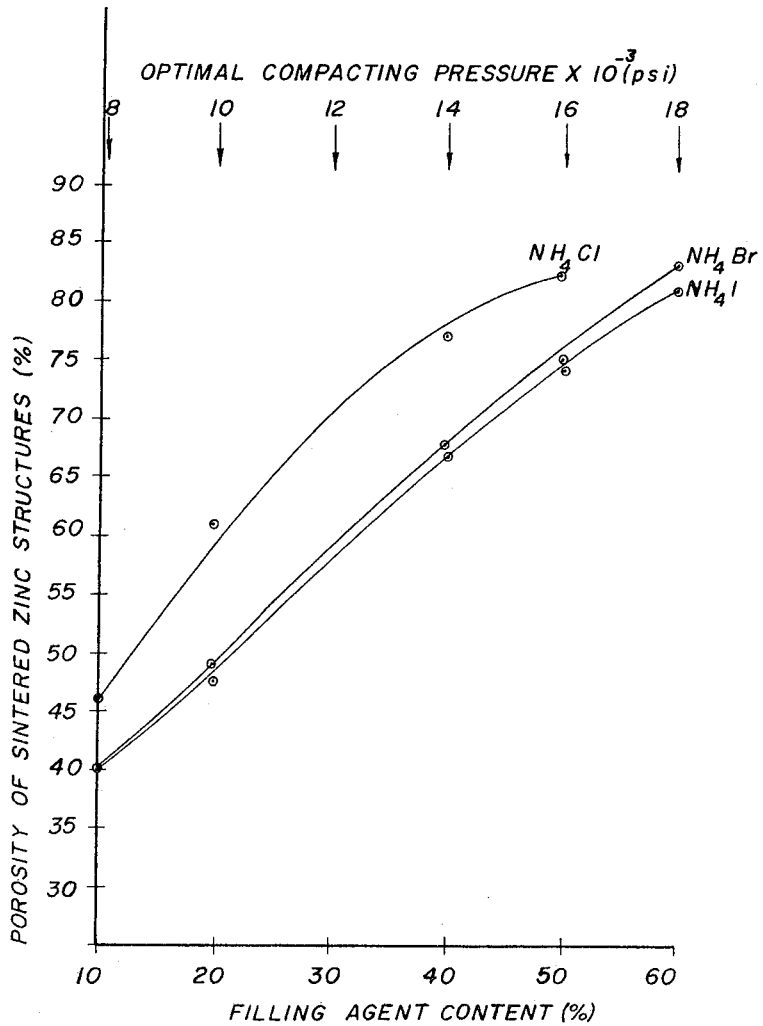
FIGURE 4 is a curve disclosing porosity as a function of filling agent content according to the invention.

As shown in Table 1 and FIGURE 4 regulating of the filling agent content provides a very sensitive means of producing any desired porosity. As a consequence of their differing densities markedly different weight percentages of the various halides excepting fluorides are used in producing any one specified porosity.

Figure 5:
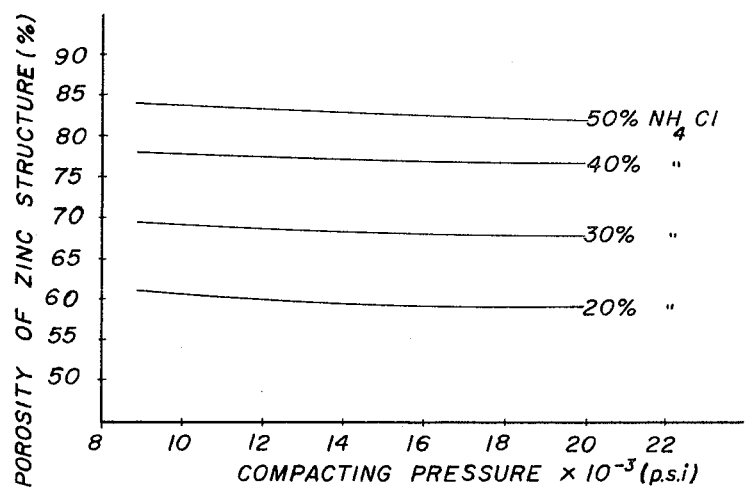
FIGURE 5 is a set of curves disclosing the porosity of a porous structure herein as a function of compacting pressure.

The influence of compacting pressure on porosity is minor as can be seen from the pressure porosity graph of FIGURE 5. A twofold increase in compacting pressure (from 9,000 to 19,000 p.s.i.) reduces the porosity obtained by only 2%.

It is therefore necessary according to this invention to regulate the porosity by filling agent content rather than by compacting pressure. An optimal pressure can be chosen to yield pellets of suitable green strength. Experimentally determined optimal pressures are listed in Table 2.

TABLE 2

Filling agent content (percent): compacting pressure (p.s.i.)
20 _____ 10,000
30 _____ 12,000
40 _____ 14,000
50 _____ 16,000
60 _____ 18,000

*Example 1*

Figure 1:
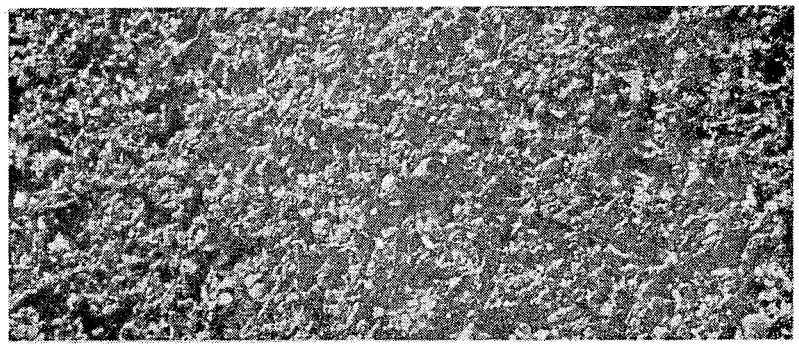
FIGURE 1 is a photograph of a section of a porous metal structure according to Example 1 hereinafter.

An intimate mixture consisting of 6.00 g. of zinc powder (−325 mesh, 3%; +325, 7%; +200, 30%; +60, 30%; +20, 0%) and 2.51 g. of ammonium chloride (−60 mesh, 100%) was compressed at 19,000 p.s.i. into a pellet, diameter 2.55 cm., height 0.53 cm. The pellet was placed in an evacuated (2 mm. Hg) glass sublimation apparatus and the temperature was raised quickly at 220° C. Ammonium chloride was sublimed quantitatively in the temperature range 220–240° C. The temperature was raised slowly to 280° C. and held at this temperature for approximately fifteen minutes. The apparatus still under evacuation was allowed to cool to room temperature and the pellet removed. The pellet resulting had a porosity of 69.5% (as measured by the volumetric method) and dimensions 2.54 cm. diameter 0.52 cm. height. The loss of zinc during the entire operation amounted to 2%. An enlarged (25×) photograph of the pellet structure is shown as FIGURE 1.

*Example 2*

The same mixture was compressed identically and the filling agent sublimed in the same way as in Example 1. The temperature was then raised quickly from 240° C. to 320° C. and the apparatus immediately allowed to cool. The pellet resulting was identical with that obtained in Example 1.

*Example 3*

Figure 2:
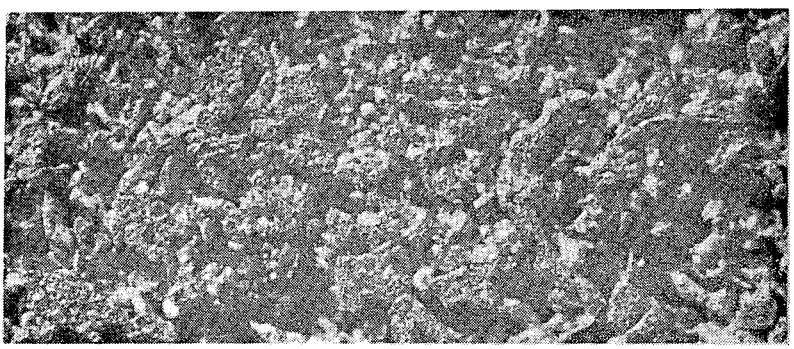
FIGURE 2 is a photograph similar to that of FIGURE 1 for Example 3 hereinafter.

An intimate mixture consisting of 6.00 zinc powder (−325 mesh, 3%; +325, 7%; +200, 30%; +100, 30%; +60, 30%; +20, 0%) and 4.1 g. ammonium bromide (−60 mesh 100%) was compressed at 14,000 p.s.i. into a pellet diameter 3.00 cm. height 0.38 cm. The pellet was placed in an evacuated (2 mm. Hg) sublimation apparatus and the temperature raised to 220° C. Ammonium bromide was sublimed quantitatively in the temperature range 220–240° C. The temperature was raised slowly to 300° C. and held at this temperature for about ten minutes. The apparatus still under evacuation was allowed to cool to room temperature and the pellet was removed. The resulting pellet had a porosity of 68% and dimensions 2.99 cm. diameter and 0.37 cm. height. The loss of the zinc during the entire operation amounted to 2%. An enlarged (25×) photograph of the pellet structure is shown as FIGURE 2.

*Example 4*

Figure 3:
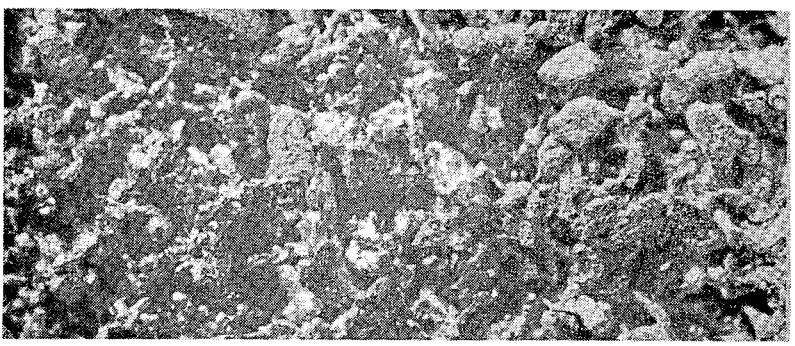
FIGURE 3 is a similar photograph of the structure resulting from Example 4 herein.

An intimate mixture of 6.00 g. zinc powder (sieve analysis as in Example 3) and 2.45 g. ammonium iodide (−60 mesh, 100%) was compressed at a pressure of 12,000 p.s.i. into a pellet, diameter 3.00 cm. height 0.29 cm. The pellet was placed in an evacuated (2 mm. Hg) sublimation apparatus and the temperature raised to 200° C. Ammonium iodide was sublimed quantitatively in the temperature range 220–260° C. The temperature was raised slowly to 300° C. and held at this temperature for about ten minutes. The apparatus still under vacuum was allowed to cool to room temperature and the pellet removed. The resulting pellet had a porosity of 58%. The loss of zinc during the entire operation amounted to 2%. An enlarged (25×) photograph of the pellet structure is shown as FIGURE 3.

From the foregoing it will be apprent that the sintered porous metal structure of the invention is of entire structural integrity i.e. each and every particle is bonded to at least one adjacent particle to define an open three-dimensional network having communicating voids extending between the particles through the structure. In practice while the metal halide formed on the surface of the metal particles may be evaporated completely, i.e., by controlled temperatures over a period of hours it is to be observed that such metal halides are soluble salts entirely compatible in small amounts with the chemistry of electrical applications as anodes of various kinds. The time of sintering sufficient to impart a desired degree of structural integrity will leave trace amounts of soluble salts within the structure. A structure of the invention may thus be identified if made of substantially uniform sized irregularly shaped particles by a photographic appearance in section similar to that demonstrated by FIGURES 1, 2 and 3 and will ordinarily contain a trace amount of a soluble filler material or metal salt. Having regard to the unavailability of porous metal structures of entire structural integrity of zinc heretofore the existence of a porous structure of such metal containing at least a trace amount of a soluble salt will indicate this invention as is source.

The invention also concerns methods of forming metal structures of entire structural integrity from particles of zinc which particles are not ordinarily adapted to be sintered due to the nature of the oxide film or coating formed thereon and present in normal atmosphere. A body may be formed according to this invention of a predetermined porosity determined by the volume of filler material employed for compaction with the metal particles. The filler is a soluble crystalline ammonium bromide chloride or iodide. The filler employed must be characterized by a sublimation temperature not greater than the temperature at which sintering of the metal particles is to be achieved. The invention embodies the increasing of the rate of sublimation by pressure control to a pressure less than atmospheric. In the vacuum sublimation technique or reactive sintering as practised herein the filler materials will sublime at less than sintering temperature of the metal and at not less than about 180° C. below such sintering temperature. If the filler sublimes at too low a temperature, i.e., at too great a temperature separation below the melting point of the metal i.e. below sintering temperature the strucure will not be sufficiently supported during sintering. Preferably therefore the filler material should not sublime or the metal halides formed therefrom vaporize or distill at less than about 200° C. below the satisfactory sintering temperature at which sufficient welding takes place. The sintering temperature may be somewhat less than melting temperature especially where a fresh metal surface is provided such as by the method and technique of the invention. This will explain a case where the sublimation temperature of the filler may be substantially below the melting temperature and yet deliver a porous body of high structural integrity according to the invention.

Porous metal structures of the invention demonstrate a very large active surface area. In FIGURE 6 an anode was set up in an experimental cell the anode being formed of zinc particles reactively sintered according to the invention with a filler of 20% ammonium chloride. The experimental cell and the conventional plant type cell with which it was compared were discharged current drain of 5 milliamperes at 1.25 volts at a temperature of −20° C. The conventional plant cell exhausted its practical life in less than three hours whereas the experimental cell maintained its practical life for substantially five times this useful life.

In FIGURE 7 a further comparison test with a similar type anode material to a different type of cell structure was compared with a conventional plant cell of the same structure at a continuous discharge 5 milliamperes at 1.3 volts at a temperature of −20° C. The useful life of the plant cell expired in less than 1½ hours whereas the experimental cell having an anode of the invention continued its useful life for more than 11 hours.

In FIGURE 8 is demonstrated an application of a zinc porous structure to an anode of an experimental cell compared with a conventional plant cell of the same design in all other respects at a temperature of 21° C. and a load of 14.5 ohms. This was an intermittent cyclic discharge of a program of 15 seconds on (to 0.8 volt) 45 seconds off. The useful cyclic discharge life of the anode of the invention again demonstrates its superiority in providing substantially four times the cyclic life of the conventional cell.

Vacuum reactive sintering of zinc of this invention involves the sublimation of the filler material at a rate which is accelerated by the use of vacuum. The fillers of the invention will sublime very slowly at normal temperature and pressure. A reduction of pressure combined with an increase in temperature greatly accelerates this property of the filler crystals. While most of the filler is sublimed, that next the surface of the zinc particles enters into chemical reaction with the oxide filler on the surface of the particles to provide zinc halide. Such metal salts are characterized by a predetermined vapour pressure at the melting temperature of the salt. The reduction of pressures accelerates the vapourization process and renders such mechanism practical.

While zinc and cadmium bromide chloride and iodide vaporize at a temperature less than the melting temperature of the corresponding zinc metal and are thus particularly suitable to the invention mechanism, it is to be noted that zinc fluoride formed by oxide reaction with a readily sublimable ammonium fluoride have melting temperatures much higher than the melting temperatures of these metals. Accordingly, while all halides are workable the fluoride metal salt will remain in the structure as a substitute for oxide film and will be present in substantial quantity but readily soluble form. In many applications this may not be a disadvantage since the structure will nevertheless be porous due to sublimation of the major portion of the filler and more than a trace amount of water soluble metal salt may be dissolved out of the structure if desired.

While the invention may find a variety of uses it is evident that battery cells having structurally superior anodes may be fabricated to provide many times the useful battery life of that experienced with battery cells of the prior art by this invention.

It is intended that the disclosures herein set forth should not be construed in any limiting sense other than that indicated by the scope of the following claims having regard to the art of forming sintered porous bodies of zinc described herein.

What we claim is:

1. In combination with a battery: a porous anode of specific anode shape and entire structural integrity in the form of a self-supporting open three dimensioned metal network consisting essentially of sintered zinc metal particles having communicating voids therebetween; and at least one weld consisting essentially of zinc metal connecting each zinc particle of substantially all said particles to at least one adjacent zinc particle of said structure and providing the sole structural connection between said particles, said particles exhibiting within said structure a particle shape modified by temperature alone.

2. In combination with a battery: a porous anode of specific anode shape and entire structural integrity in the form of a self-supporting open three dimensioned metal network consisting essentially of sintered zinc metal particles having communicating voids therebetween; and at least one weld consisting essentially of zinc metal connecting each zinc particle of substantially all said particles to at least one adjacent zinc particle of said structure and providing the sole structural connection between said particles, said anode structure being of a bulk density less than about one-half the density of zinc metal.

3. In combination with a battery: a porous anode of specific anode shape and entire structural integrity in the form of a self-supporting open three dimensioned metal network consisting essentially of sintered zinc metal particles having communicating voids therebetween; and at least one weld consisting essentially of zinc metal connecting each zinc particle of substantially all said particles to at least one adjacent zinc particle of said structure and providing the sole structural connection between said particles, the screen size distribution of the particles of said structure containing not more than about ten percent minus 325 mesh screen size.

4. In combination with a battery: a porous anode of specific anode shape and entire structural integrity in the form of a self-supporting open three dimensioned metal network consisting essentially of sintered zinc metal particles having communicating voids therebetween; and at least one weld consisting essentially of zinc metal connecting each zinc particle of substantially all said particles to at least one adjacent zinc particle of said structure and providing the sole structural connection between said particles, said particles exhibiting within said structure a particle shape modified by temperature alone, said anode structure being of a bulk density less than about one-half the density of zinc metal.

5. In combination with a battery: a porous anode of specific anode shape and entire structural integrity in the form of a self-supporting open three dimensioned metal network consisting essentially of sintered zinc metal particles having communicating voids therebetween; and at least one weld consisting essentially of zinc metal connecting each zinc particle of substantially all said particles to at least one adjacent zinc particle of said structure and providing the sole structural connection between said particles, said structure having an enlarged photographic appearance in section similar to FIGURE 1 of the drawings hereof.

6. In combination with a battery: a porous anode of specific anode shape and entire structural integrity in the form of a self-supporting open three dimensional metal network consisting essentially of sintered metal particles having communicating voids therebetween; and at least one weld consisting essentially of zinc metal connecting each zinc particle of substantially all said particles to at least one adjacent zinc particle of said structure and providing the sole structural connection between said particles, said structure having an enlarged photographic appearance in section similar to FIGURE 2 of the drawings hereof.

7. In combination with a battery: a porous anode of specific anode shape and entire structural integrity in the form of a self-supporting open three dimensional metal network consisting essentially of sintered zinc metal particles having communicating voids therebetween; and at least one weld consisting essentially of zinc metal connecting each zinc particle of substantially all said particles to at least one adjacent zinc particle of said structure and providing the sole structural connection between said particles, said structure having an enlarged photographic appearance in section similar to FIGURE 3 of the drawings hereof.

References Cited

UNITED STATES PATENTS

| | | | |
|---|---|---|---|
| 2,662,928 | 12/1953 | Brennan | 136—24 |
| 2,828,351 | 3/1958 | Rade | 136—125 |
| 3,048,644 | 8/1962 | Euler | 136—120 |
| 3,069,486 | 12/1962 | Solomon et al. | 136—30 |
| 3,071,638 | 1/1963 | Clark et al. | 136—125 |

OTHER REFERENCES

Metal Finishing, Guidebook Directory, 1962, 30th edition; page 396, relied on.

WINSTON A. DOUGLAS, *Primary Examiner.*

A. SKAPARS, *Assistant Examiner.*